(12) United States Patent
Iwamoto et al.

(10) Patent No.: US 6,824,920 B1
(45) Date of Patent: Nov. 30, 2004

(54) NON-AQUEOUS ELECTROLYTE SECONDARY BATTERY COMPRISING COMPOSITE PARTICLES

(75) Inventors: Kazuya Iwamoto, Osaka (JP); Hizuru Koshina, Osaka (JP); Harunari Shimamura, Osaka (JP); Yoshiaki Nitta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/601,421

(22) PCT Filed: Nov. 30, 1999

(86) PCT No.: PCT/JP99/06689

§ 371 (c)(1),
(2), (4) Date: Sep. 28, 2000

(87) PCT Pub. No.: WO00/33403

PCT Pub. Date: Jun. 8, 2000

Related U.S. Application Data

(63) Continuation-in-part of application No. 09/090,484, filed on Jun. 3, 1998, now Pat. No. 6,090,505.

(30) Foreign Application Priority Data

| Jun. 3, 1997 | (JP) | 9-144873 |
| May 6, 1998 | (JP) | 10-123199 |
| Dec. 2, 1998 | (JP) | 10-342887 |
| Dec. 2, 1998 | (JP) | 10-342888 |

(51) Int. Cl.[7] .................... H01M 4/38; H01M 4/42
(52) U.S. Cl. ............... 429/218.1; 429/229; 429/231.95
(58) Field of Search .............. 429/218.1, 229, 429/231.95, 304, 307

(56) References Cited

U.S. PATENT DOCUMENTS

| 4,302,518 A | 11/1981 | Goodenough et al. |
| 4,303,748 A | 12/1981 | Armand et al. |

(List continued on next page.)

FOREIGN PATENT DOCUMENTS

| EP | 0693568 | 1/1996 |
| EP | 0 730 316 | 9/1996 |

(List continued on next page.)

OTHER PUBLICATIONS

Japanese search report for PCT/JP99/06689 dated Feb. 22, 2000.

English translation of Form PCT/ISA/210, for PCT/JP99/06689. dated Feb. 15, 2000.

(List continued on next page.)

*Primary Examiner*—Susy Tsang-Foster
(74) *Attorney, Agent, or Firm*—RatnerPrestia

(57) ABSTRACT

The present invention relates to a non-aqueous electrolyte secondary battery. The negative electrode of the present invention is characterized by its composite particles constructed in such a manner that at least part of the surrounding surface of nuclear particles containing at least one of tin, silicon and zinc as a constituent element, is coated with a solid solution or an intermetallic compound, which are composed of the element contained in the nuclear particles, and at least one other element except the elements contained in the nuclear particles selected from a group comprising group 2 elements, transition elements, group 12 elements, group 13 elements and group 14 elements except carbon of the Periodic Table. The electrolyte uses anion lithium salts of organic acid dissolved in organic solvent with high oxidation resistant characteristics. By adopting the above construction, a battery which generates only a small amount of gas during a high temperature storing can be obtained. Furthermore, the batteries enjoy high energy density and a lower reduction rate of discharge capacity when used repeatedly as well as high charge/discharge properties.

11 Claims, 1 Drawing Sheet

U.S. PATENT DOCUMENTS

| | | | |
|---|---|---|---|
| 4,427,751 A | 1/1984 | Furukawa et al. | |
| 4,489,143 A | 12/1984 | Gilbert et al. | |
| 4,495,358 A | 1/1985 | Koyama et al. | |
| 4,632,889 A | 12/1986 | McManis et al. | |
| 4,950,566 A | 8/1990 | Huggins et al. | |
| 5,085,952 A | 2/1992 | North | |
| 5,160,712 A | 11/1992 | Thackeray et al. | |
| 5,223,353 A | 6/1993 | Ohsawa et al. | |
| 5,275,750 A | 1/1994 | Sato et al. | |
| 5,296,318 A | 3/1994 | Gozdz et al. | |
| 5,395,711 A | 3/1995 | Tahara et al. | |
| 5,460,903 A | 10/1995 | St. Hubbard et al. | |
| 5,587,256 A | 12/1996 | Wilson et al. | |
| 5,589,296 A | 12/1996 | Iwamoto et al. | |
| 5,624,606 A | 4/1997 | Wilson et al. | |
| 5,665,265 A | 9/1997 | Gies et al. | |
| 5,677,081 A | 10/1997 | Iwamoto et al. | |
| 5,770,333 A | 6/1998 | Saito et al. | |
| 5,824,434 A | 10/1998 | Kawakami et al. | |
| 5,827,331 A | 10/1998 | Block et al. | |
| 5,900,335 A | 5/1999 | Nishimura et al. | |
| 6,090,505 A | 7/2000 | Shimamura et al. | |
| 6,605,386 B1 * | 8/2003 | Kasamatsu et al. | 429/218.1 |

FOREIGN PATENT DOCUMENTS

| | | | |
|---|---|---|---|
| EP | 0883199 | 12/1998 | |
| JP | 63-276873 | 11/1988 | |
| JP | 3-14054 | 1/1991 | |
| JP | 03-037964 | 2/1991 | |
| JP | 04-095345 | 3/1992 | |
| JP | 04-206479 | 7/1992 | |
| JP | 04-242890 | 8/1992 | |
| JP | 04-249073 | 9/1992 | |
| JP | 04-267053 | 9/1992 | |
| JP | 05-62712 | 3/1993 | |
| JP | 05-234593 | 9/1993 | |
| JP | 05-310418 | 11/1993 | |
| JP | 06-36798 | 2/1994 | |
| JP | 06-098473 | 4/1994 | |
| JP | 06-103976 | 4/1994 | |
| JP | 06-279049 | 10/1994 | |
| JP | 07-296854 | 11/1995 | |
| JP | 7-240201 | 12/1995 | |
| JP | 7-315822 | 12/1995 | |
| JP | 08-250117 | 9/1996 | |
| JP | 9-63651 | 7/1997 | |
| JP | 09-259857 | 10/1997 | |
| JP | 10-3947 | 1/1998 | |
| JP | 10-036120 | 2/1998 | |
| JP | 10-92424 | 4/1998 | |
| JP | 10-092424 A * | 4/1998 | |
| JP | 10-208741 | 8/1998 | |
| JP | 10-257687 | 9/1998 | |
| JP | 10-509683 | 9/1998 | |
| JP | 10-316426 | 12/1998 | |
| JP | 10-321225 | 12/1998 | |
| JP | 11-135120 | 5/1999 | |
| JP | 11-185753 | 7/1999 | |
| JP | 11-297311 | 10/1999 | |
| JP | 2000-30703 | 1/2000 | |
| WO | 96/10538 | 9/1995 | |
| WO | WO-98/07729 * | 2/1998 | |

OTHER PUBLICATIONS

A. Rogier et al., "Effect of Cobalt Substitution on Cationic Distribution in $LiNi_{1-y}Co_yO_2$ Electrode Materials", *Solid State Ionics*, 90 (1996) pp. 83–90, no month.

K. M. Abraham et al., "$Li^+$–Conductive Solid Polymer Electrolytes with Liquid–Like Conductivity", Journal Electrochem. Society, vol. 137, No. 5, pp. 1657–1658 (1990), no month.

M. Armand et al., "Polymeric Solid Electrolytes", Second International Meeting on Solid Electrolytes (1978), no month.

N. Ogata, "Conductive Polymer," 1990, pp. 95–109 (w/English translation).

J.R. MacCallum et al., "Polymer Electrolyte Reviews–2," 1989, pp. 229–305, no month.

International Search Report corresponding to application No. PCT/JP99/06687 dated Feb. 22, 2000.

* cited by examiner

NON-AQUEOUS ELECTROLYTE SECONDARY BATTERY COMPRISING COMPOSITE PARTICLES

This Application is a U.S. National Phase Application of PCT International Application No. PCT/JP99/06689, filed Nov. 30, 1999. This application is a continuation-in-part of U.S. application Ser. No. 09/090,484, filed Jun. 3, 1998, now U.S. Pat. No. 6,090,505 issued Jul. 18, 2000.

BACKGROUND OF THE INVENTION

The present invention relates to a non-aqueous electrolyte secondary battery (hereinafter, battery), and especially relates to batteries whose electrochemical properties such as the charge/discharge capacity and charge/discharge cycle life have been enhanced by improvements in negative electrode materials, and solvents used for the non-aqueous electrolytes.

In recent years, lithium secondary batteries with non-aqueous electrolytes, which are used in such fields as mobile communications devices including portable information terminals and portable electronic devices, main power sources of portable electronic devices, small size domestic portable electricity storing devices, motor cycles using an electric motor as a driving source, electric cars and hybrid electric cars, have characteristics of a high electromotive force and a high energy density.

When lithium metal with a high capacity is used as a negative electrode material, dendritic deposits are formed on the negative electrode during charging. Over repeated charging and discharging, these dendritic deposits penetrate through separators and polymer gel electrolytes to the positive electrode side, causing an internal short circuit. During discharging, these dendritic deposits break, falling from the surface of the bulk lithium-metal negative electrode, thus forming "dead" lithium which does not contribute to charge/discharge reaction. Furthermore, reaction activity of the deposited lithium is high since they have a large specific surface area. Due to this, the lithium reacts with solvents in the electrolytic solution on their surfaces, and form a surface film similar to a solid electrolyte which has no electronic conductivity. This increases the internal resistance of the batteries, causing some particles to be excluded from the network of the electronic conduction, thereby lowering the charge/discharge efficiency of the battery. For these reasons, the lithium secondary batteries using lithium metal as a negative electrode material have a low reliability and a short cycle life.

To suppress the formation of such dendrites, it has been proposed that lithium alloys such as a lithium-aluminum alloy and a wood's alloy are used instead of lithium metal. Metals capable of forming alloys with lithium and alloys containing at least one such metal can be used as a negative electrode material with a relatively high electrochemical capacity in the initial charge/discharge cycle. However, by repeatedly alloying with and deintercalating lithium, they may undergo a phase change even when the crystal structure of the original alloy is maintained, or sometimes, the crystal structure of the alloy itself changes.

In this case, particles of the metal or an alloy which are host materials of the lithium (active material), swell and shrink. As the charge/discharge cycle proceeds, crystal grains are stressed and cracked, thus particles are pulverized and leave off from the electrode plate. As the particles are pulverized, grain boundary resistance and contact resistance of the grain boundaries increase. As a result, resistance polarization during charging and discharging increases. Thus, when charging is conducted at a controlled voltage level, charging depth becomes shallow, limiting the amount of charged electricity in the battery. On the other hand, during discharging, the voltage level is decreased by the resistance polarization, reaching the discharge-termination voltage early. Thus, superior charge/discharge capacity and cycle properties are difficult to achieve.

Nowadays, lithium secondary batteries which use, as a negative electrode material, carbon materials capable of intercalating and deintercalating lithium ions, are commercially available. In general, lithium metal does not deposit on carbon negative electrodes. Thus, short circuits are not caused by dendrites. However, the theoretical capacity of graphite which is one of the currently used carbon materials is 372 mAh/g, only one tenth of that of pure Li metal.

Other active material compounds include diniobium pentaoxide ($Nb_2O_5$), titanium disulfide ($TiS_2$), molybdenum dioxide ($MoO_2$), lithium titanate ($Li_{4/3}Ti_{5/3}O_4$). In the case of these materials, lithium is ionized and maintained among the host substances. Due to this, compared with lithium metal whose chemical activity is high, these materials are chemically stable, do not form dendritic deposits, and contribute to higher cycle properties. Among them, some carbon materials are already commercialized.

Other known, negative electrode materials include pure metallic materials and pure non-metallic materials which form composites with lithium. For example, composition formulae of compounds of tin(Sn), silicon (Si) and zinc (Zn) with the maximum amount of lithium are respectively $Li_{22}Sn_5$, $Li_{22}Si_5$, and $LiZn$. Within the range of these composition formulae, metallic lithium does not normally deposit. Thus, an internal short circuit is not caused by dendrites. Furthermore, the electrochemical capacities between these compounds and each element mentioned above are respectively 993 mAh/g, 4199 mAh/g and 410 mAh/g; all are larger than the theoretical capacity of graphite.

As other compound negative electrode materials, the Japanese Patent Laid-Open Publication No. H07-240201 discloses a non-metallic silicide comprising transition elements. The Japanese Patent Laid-Open Publication No. H09-63651 discloses negative electrode materials which are made of inter-metallic compounds comprising at least one of group 4B elements, P and Sb, and have a crystal structure of one of the CaF2 type, the ZnS type and the AlLiSi type.

As a solvent of the electrolyte of the battery, cyclic carbonates such as propylene carbonate and ethylene carbonate, acyclic carbonates such as diethyl carbonate, and dimethyl carbonate, cyclic carboxylate such as gamma-butyrolactone and gamma-valerolactone, acyclic ethers such as dimethoxy ethane and 1,3-dimethoxy propane, and cyclic ethers such as tetrahydrofuran and 1,3-dioxolane are widely used.

It is desirable to adopt electrolyte with high electrical conductivity to the batteries. Due to this, solvents with a high dielectric constant and a low viscosity are preferably used. However, being high in the dielectric constant simply means high in polarity, in other words, high in viscosity. Therefore, among the electrolytes mentioned above, solvents with high dielectric constant such as propylene carbonate (dielectric constant $\in=65$) and solvents with low dielectric constant such as 1,2-dimethoxy ethane ($\in=7.2$) are often mixed and used.

The electrolyte used in the non-aqueous electrolyte batteries also contain supporting electrolytes dissolved in the solvents mentioned above at a concentration of about 1 mol. The supporting electrolytes include anion lithium salts of inorganic acid such as lithium perchlorate, lithium borofluorides and lithium phosphofluoride, and anion lithium salts of organic acid such as trifluoromethane sulfonic acid lithium and bis-trifluoromethane sulfonic acid imido lithium.

But, the above high capacity negative electrode materials include following problems.

Negative electrode materials of pure metallic materials and pure non-metallic materials which form compounds with lithium have inferior charge/discharge cycle properties compared with carbon negative electrode materials. The reason for this is assumed to be the destruction of the negative electrode materials caused by their volume expansion and shrinkage.

On the other hand, as negative electrode materials with an improved cycle life property unlike the foregoing pure materials, the Japanese Patent Laid-Open Publication No. H07-240201 and the Japanese Patent Laid-Open Publication No. H09-63651 respectively disclose non-metallic silicides composed of transition elements and intermetallic compounds which are composed of at least one of group 4B elements, P and Sb, and have a crystal structure of one of the $CaF_2$ type, the ZnS type and the AlLiSi type.

Batteries using the negative electrode materials comprising the non-metallic silicides composed of transition elements are disclosed in the Japanese Patent Laid-Open Publication No. H07-240201. The capacities of the embodiments of the invention and a comparative example at the first cycle, the fiftieth cycle and the hundredth cycle suggest that the batteries of the invention have improved charge/discharge cycle properties compared with lithium metal negative electrode materials. However, when compared with a negative electrode material of natural graphite, the increase in the capacity of the battery is only about 12%.

The materials disclosed in the Japanese Patent Laid-Open Publication No. H09-63651 have a better charge/discharge cycle property than a Li-Pb alloy negative electrode material according to an embodiment and a comparative example. The materials also have a larger capacity compared with a graphite negative electrode material. However, the discharge capacity decreases significantly up to the 10–20th charge/discharge cycles. Even when $Mg_2Sn$, which is considered to be better than any of the other materials, is used, the discharge capacity decreases to approximately 70% of the initial capacity after about the 20th cycle. Thus, their charge/discharge properties are inferior.

When lithium metal is used as a negative electrode, the electrolyte, which is in contact with the negative electrode, and is exposed to an extremely high reduction atmosphere, tends to react with the lithium metal, and is consequently reduced, and decomposed. Regarding lithium alloys, when those predominantly composed of lithium are used in the negative electrode, the potential of the negative electrode becomes almost same as that of lithium metal, thus reduction and decomposition of the electrolyte occur in the same manner as the lithium metal. Furthermore, as mentioned earlier, the negative active materials get pulverized over repeated charges and discharges, and inevitably fall off from the electrode plate.

In the case of the alloys whose main constituent metal is not lithium, the potential of the negative electrode becomes noble compared with lithium metal or the foregoing lithium alloys. Thus, the electrolyte, which could be reduced and decomposed when contacting the foregoing lithium alloys, can be used. However, compared with the foregoing lithium alloys, these alloys whose main constituent metal is not lithium are hard and brittle, and thus get pulverized significantly, and inevitably fall off from the electrode plate.

If currently used solvents such as ethylene carbonate, dimethyl carbonate, diethyl carbonate, ethylmethyl carbonate, propylene carbonate, gamma-butyrolactone, and gamma-valerolactone are adopted for a system in which lithium metal or a lithium alloy is used in a negative electrode, the electrolyte may decompose and gas may be produced when the battery is charged and stored at high temperatures. Moreover, if the battery is repeatedly charged and discharged, parallel to the charge/discharge reaction in the negative electrode, the electrolyte is gasified, lowering the charge/discharge efficiency, resulting in decreased cycle properties.

When graphite-group carbon materials are used as a negative electrode material, and propylene carbonate is adopted for an electrolytic solution, the electrolyte decomposes at potentials more noble than that of lithium metal. Consequently, lithium ions are not intercalated between layers of graphite, thus the battery does not function. Considering these points, currently commercialized lithium secondary batteries with the graphite used for negative electrode materials frequently use electrolyte containing ethylene carbonate. However, the melting point of ethylene carbonate is 37° C. higher than room temperature. Therefore, at low temperatures, ionic conductivity of the electrolyte for lithium ions plummets, lowering charge/discharge priorities.

When inorganic compound materials such as titanium disulfide are used as a negative electrode active material, intercalation and de-intercalation of lithium occur at sufficiently noble potentials compared with lithium metal and lithium alloys. Thus, even when the negative electrode active materials come into contact with the electrolyte, reduction decomposition does not occur. Moreover, even when propylene carbonate is used for the electrolytic solution, intercalation and de-intercalation are not impeded by decomposition as it is the case with the graphite materials, therefore, a wider range of electrolytes are applicable. However, potentials of the negative electrode using the foregoing inorganic compound materials is noble, causing battery voltage to inevitably become low. This is a disadvantage of achieving higher energy density.

Regarding the supporting electrolytes, the thermal stability of lithium perchlorate, lithium borofluorides and lithium fluorophosphate needs to be improved. Furthermore, fluorine-containing inorganic anion salts contained in the forgoing compounds react with trace amounts of water contained in an electrolyte and decompose.

The present invention aims to address the forgoing problems of conventional batteries.

BRIEF SUMMARY OF THE INVENTION

The negative electrode of the batteries of the present invention is characterized by its main material which uses composite particles constructed in such a manner that at least part of the surrounding surface of nuclear particles containing at least one of tin, silicon and zinc as a constituent element, is coated with a solid solution or an inter-metallic compound composed of an element contained in the nuclear particles and at least one element (exclusive of the elements contained in the nuclear particles) selected from a group comprising group 2 elements, transition elements, group 12 elements, group 13 elements and group 14 elements (exclusive of carbon) of the Periodic Table.

Further, the solvents of the electrolyte of the batteries of the present invention include at least one compound selected from a group comprising ethylene carbonate, dimethyl carbonate, diethyl carbonate, ethylmethyl carbonate, propylene carbonate, gamma-butyrolactone and gamma-valerolactone.

Moreover, the supporting electrolytes in the electrolyte of the batteries of the present invention includes at least one compound selected from a group comprising bis-trifluoromethane sulfonic acid imido lithium, bis-pentafluoro ethane sulfonic acid imido lithium, bis(1,2-benzene diolate(2-)-O,O')lithium borate, bis(2,3-naphthalene diolate(2-)-O,O')lithium borate, bis(2,2'-biphenyl diolate(2-)-O,O')lithium borate, and bis(5-fluoro-2-olate-1-benzene sulfonic acid-O,O')lithium borate.

The foregoing construction provides batteries which rarely suffer generation of gas when stored at high temperatures. Moreover, even when the batteries are repeatedly charged and discharged, charge/discharge efficiency of their negative electrode does not decrease. The batteries can be used in a wide range of temperatures. Furthermore, the batteries enjoy high energy density, maintain discharge capacity well over repeated use as well as high charge/discharge properties.

BRIEF DESCRIPTION OF THE SEVERAL VIEWS OF THE DRAWINGS

The foregoing summary as well as the following Detailed Description of Preferred Embodiments of the Invention, will be better understood when read in conjunction with the appended drawing. For the purpose of illustrating the invention, there is shown in the drawing, an embodiment which is presently preferred. It should be understood, however, that the invention is not limited to the precise arrangements and instrumentalities shown.

DETAILED DESCRIPTION OF THE INVENTION

Figure 1:
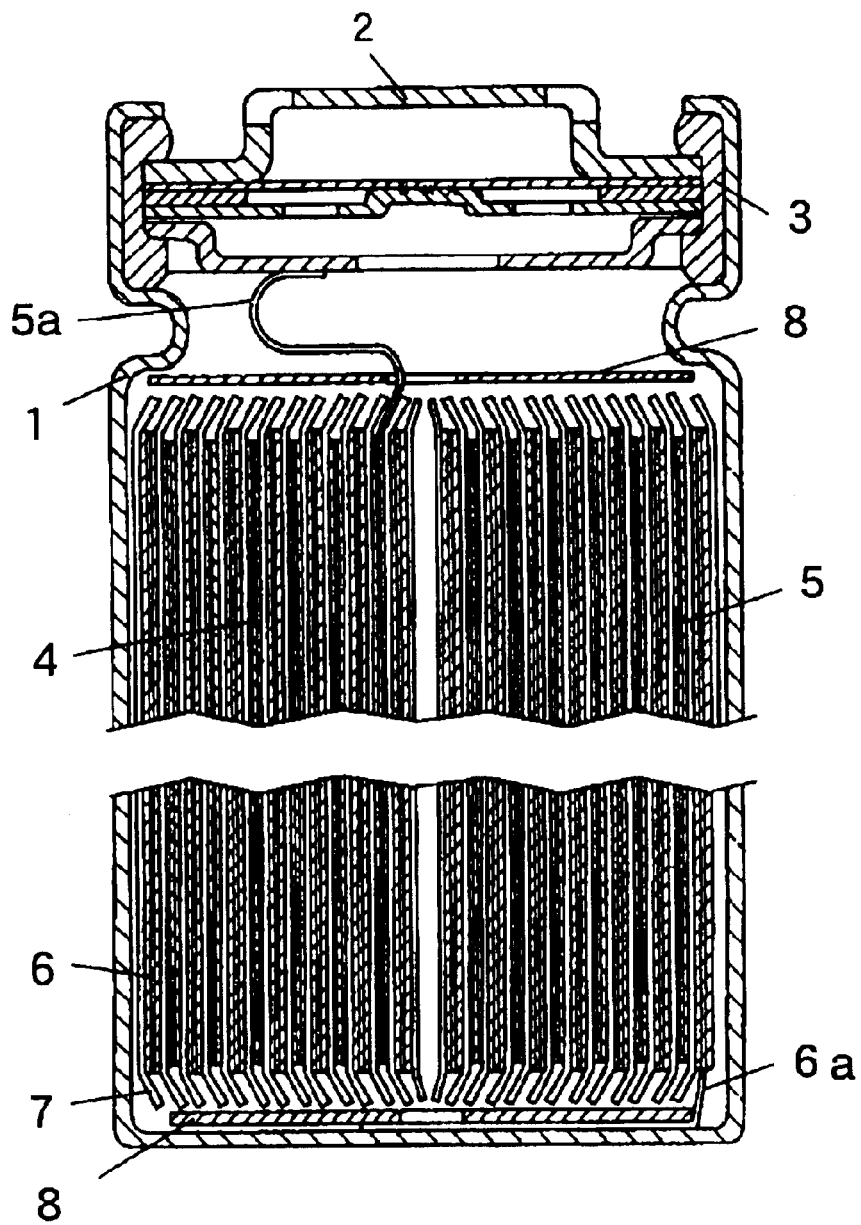
FIG. 1 shows a vertical cross section of a cylindrical battery of the present invention.

The batteries of the present invention comprise positive and negative electrodes capable of intercalating and de-intercalating lithium, a non-aqueous electrolytic solution and separators or solid electrolytes.

As a negative electrode material used in the present invention, composite particles whose nuclear particles composed of solid phase A are coated with solid phase B over the whole surface or part of the surface, are used. The solid phase A contains at least one of tin, silicon and zinc as a constituent element. The solid phase B is composed of a solid solution or inter-metallic compounds composed of at least one of tin, silicon and zinc and at least one element (exclusive of the foregoing constituent elements) selected from a group comprising group 2 elements, transition elements, group 12 elements, group 13 elements and group 14 elements (exclusive of carbon) of the Periodic Table. Hereinafter, the foregoing negative electrode materials are called "composite particles". When the composite particles are used as a negative electrode material, the solid phase B helps to suppress expansion and shrinkage of the solid phase A caused by charging and discharging, thereby achieving a negative electrode material with superior charge/discharge cycle properties.

It can be considered that the solid phase A of the negative electrode material of the present invention mainly contributes to a higher charge/discharge capacity since it contains at least one of Sn, Si and Zn, and the solid phase B which coats the whole or part of the surrounding surface of the nuclear particles comprising the solid phase A, contributes to improvement of the charge/discharge cycle properties. The amount of lithium contained in the solid phase B is normally less than that contained in metal, a solid solution or an inter-metallic compound.

In other words, the negative electrode material used in the present invention is constructed such that particles, which contain at least one of high-capacity Sn, Si and Zn as a constituent element, are coated with the solid solution or the inter-metallic compounds which are resistant to pulverization. The solid solution or the inter-metallic compound in the coating layer prevents significant changes in crystal structure, namely changes in volume of the nuclear particles caused by electrochemical intercalating and deintercalating of lithium. In this manner, pulverization of nuclear particles is restricted.

Further, within the composite particles, only the solid phase B, which does not contain so much of active lithium, comes in contact with the electrolyte. Therefore, even when the solid phase B is in contact with the electrolyte, the electrolyte does not decompose easily. The solvents and supporting electrolytes of the electrolyte are highly stable against heat, and also stable against water contained in the electrolyte. Thus, it is thought when the battery is stored at high temperatures, gas is rarely generated.

The method of manufacturing composite particles used in the negative electrode is described in the followings.

In one manufacturing method of the composite materials, a fused mixture of elements contained in the composite particles at a predetermined composition ratio is quenched and solidified by dry-spraying, wet-spraying, roll-quenching or turning-electrode method. The solidified material is heat treated at a temperature lower than the solid line temperature of a solid solution or intermetallic compounds. The solid line temperature is determined by the composition ratio. The quenching and solidifying of the fused mixture allows the solid phase A to deposit as a nucleus of a particle, and at the same time, allows the solid phase B, which coats part of or the whole surface of the solid phase A, to deposit. The following heat treatment enhances evenness of the solid phase A and the solid phase B. Even when the heat treatment is not conducted, composite particles suitable for the present invention can be obtained. Apart from the quenching method mentioned above, other methods are applicable providing they can quench the fused mixture rapidly and adequately.

In another manufacturing method, a layer of deposits comprising essential elements in forming solid phase B is formed on the surface of the powder of the solid phase A. The layer is treated at temperatures lower than the solid phase line. This heat treatment allows constituent elements within the solid phase A to disperse throughout the deposit layer to form the solid phase B as a coating layer. The deposit layer can be formed by plating or by a mechanical alloying method. In the case of the mechanical alloying method, the heat treatment is not always necessary. Other methods can also be used on the condition that they can form the deposit layer.

As a conductive material for the negative electrode, any electronic conductive materials can be used. Examples of such materials include graphite materials including natural graphite (scale-like graphite) synthetic graphite and expanding graphite; carbon black materials such as acetylene black, highly structured furnace black, channel black, furnace black, lamp black and thermal black; conductive fibers such as carbon fibers and metallic fibers; metal powders such as copper and nickel; and organic conductive materials such as polyphenylene derivatives. These materials can be used independently or in combination. Among these conductive materials, synthetic graphite, acetylene black and carbon fibers are especially favorable.

The total amount of the additives is not specifically defined, however, 1–50 wt %, especially 1–30% of the negative electrode materials is desirable. As negative electrode materials (composite particles) of the present invention are themselves conductive, even if conductive materials are not added, the battery can still actually function. Therefore, the battery has more room available to contain composite particles.

Binders for the negative electrode can be either thermoplastic resin or thermosetting resin. Desirable binders for the present invention includes the following materials; polyethylene, polypropylene, polytetrafluoroethylene (PTFE), polyvinylidene fluoride (PVDF), styrene-butadiene rubber, a tetrafluoroethylene-hexafluoropropylene copolymer (FEP), a tetrafluoroethylene-perfluoroalkyl vinyl ether copolymer (PFA), a vinyliden fluoride-hexafluoropropylene copolymer, a vinyliden fluoride-chlorotrifluoroethylene copolymer, a ethylene-tetrafluoroethylene copolymer (ETFE), poly chlorotrifluoroethylene (PCTFE), a vinyliden fluoride-pentafluoropropylene copolymer, a propylene-tetrafluoroethylene copolymer, a ethylene-chlorotrifluoroethylene copolymer (ECTFE), a vinyliden fluoride-hexafluoropropylene-tetrafluoroethylene copolymer, a vinyliden fluoride perfluoromethyl vinyl ether-tetrafluoroethylene copolymer, an ethylene-acrylic acid copolymer or its Na+ ion crosslinking body, an ethylene-methacrylic acid copolymer or its Na+ ion crosslinking body, a methyl acrylate copolymer or its Na+ ion crosslinking body, and an ethylene methyl methacrylate copolymer or its Na+ ion crosslinking body. Favorable materials among these materials are styrene butadiene rubber, polyvinylidene fluoride, an ethylene-acrylic acid copolymer or its Na+ ion crosslinking body, an ethylene-methacrylic acid copolymer or its Na+ ion crosslinking body, a methyl acrylate copolymer or its Na+ ion crosslinking body, and an ethylene methyl methacrylate copolymer or its Na+ ion crosslinking body.

As a current collector for the negative electrode, any electronic conductor can be used on the condition that it does not chemically change in the battery. For example, stainless steel, nickel, copper, titanium, carbon, conductive resin, as well as copper and stainless steel whose surfaces are coated with carbon, nickel or titanium can be used. Especially favorable materials are copper and copper alloys. Surfaces of these materials can be oxidized. It is desirable to treat the surface of the current collector to make it uneven. Usable forms of the foregoing materials as the current collector include a foil, a film, a sheet, a mesh sheet, a punched sheet, a lath form, a porous form, a foamed form and a fibrous form. The thickness is not specifically defined however, normally those of 1–500 $\mu$m in thickness are used.

As positive electrode active materials, lithium compounds or non-lithium containing compounds can be used. Such compounds include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (M is at least one of Na, Mg, Sc, Y, Mn, Fe, Co, Ni, Cu, Zn, Al, Cr, Pb, Sb and B, and x=0–1, Y=0–0.9, z=2.0–2.3). The value of x is the value before charging and discharging, thus it changes along with charging and discharging. Other usable positive electrode materials include transition metal chalcogenides, a vanadium oxide and its lithium compounds, a niobium oxide and its lithium compounds, a conjugate polymer using organic conductive materials, and shevril phase compounds. It is also possible to use a plurality of different positive electrode materials in a combined form. The average diameter of particles of the positive electrode active materials is not specifically defined, however desirably it is 1–30 $\mu$m.

Conductive materials for the positive electrode can be any electronic conduction material on the condition that it does not chemically change within the range of charge and discharge electrical potentials of the positive electrode materials in use. Examples of such materials include graphite materials including natural graphite (scale-like graphite) and synthetic graphite; carbon black materials such as acetylene black, highly structured furnace black, channel black, furnace black, lamp black and thermal black; conductive fibers such as carbon fibers and metallic fibers; fluorinated carbon; metal powders such as aluminum; conductive whiskers such as a zinc oxide and potassium titanate, conductive metal oxides such as a titanium oxide, and organic conductive materials such as polyphenylene derivatives. These materials can be used independently or in combination. Among these conductive materials, synthetic graphite and acetylene black are especially favorable.

The total amount of the conductive materials to be added is not specifically defined, however, 1–50 wt %, especially 1–30% of the positive electrode materials is desirable. In the case of carbon and graphite, 2–15 wt % is especially favorable.

Binders for the positive electrode can be either thermoplastic resin or thermosetting resin. The binders for the negative electrode mentioned earlier can be used effectively, however, PVDF and PTFE are more preferable.

Current collectors for the positive electrode of the present invention can be any electronic conductive materials on the condition that it does not chemically change within the range of charge and discharge electric potentials of the positive electrode materials in use. For example, the current collectors for the negative electrode mentioned earlier can be used effectively. The thickness of the current collectors is not specifically defined, however, those of 1–500 $\mu$m in thickness are used.

As electrode mixtures for the positive electrode and the negative electrode plates, conductive materials, binders, fillers, dispersants, ionic conductors, pressure enhancers, and other additives can be used. Any fiber material, which does not change chemically in the battery, can be used as fillers. In general, fibers of olefin polymers such as polypropylene and polyethylene, and fibers such as glass and carbon are used as fillers. The amount of the filler to be added is not specifically defined however, it is desirably b 0–30wt % of the electrode binders.

As for the construction of the positive electrode and the negative electrode, it is favorable that at least the surfaces of the negative electrode and the positive electrode where there are the electrode mixtures are facing each other.

The non-aqueous electrolytes of the present invention are formed by dissolving anionic lithium salts of organic acid in non-aqueous solvents with a high oxidation resistance.

Examples of non-aqueous solvents include cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); aliphatic carboxylates such as methyl formate, methyl acetate, methyl propionate, and ethyl propionate; gamma-lactones such as gamma-butyrolactone (GBL) and gamma-valerolactone; acyclic ethers such as 1,2-dimethoxy ethane (DME), 1,2-diethoxy ethane (DEE), and ethoxy methoxy ethane (EME); cyclic ethers such as tetrahydrofuran and 2-methyl tetrahydrofuran; and non-protonic organic solvents such as dimethyl sulfoxide, 1,3-dioxolane, formamide, acetamide, dimethylformamide, dioxolane, acetonitrile, propylnitrile, nitromethane, ethyl monoglime, triester phosphoric acid, trimethoxymethyne, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane saltone, anisole, dimethyl sulfoxide and N-methyl pyrolidon, These solvents are used independently or as a mixture of two or more solvents. Mixtures of cyclic carbonate and acyclic carbonate, or cyclic carbonate, acyclic carbonate and aliphatic carboxylate are especially favorable.

Among these solvents, as solvents having high oxidation resistance, EC, DMC, DEC, EMC, PC, GBL and gamma-valero lactone are preferable.

Conventionally, it has been difficult to adopt PC for lithium ion secondary batteries using graphite materials which are widely used, since PC decomposes when it comes into contact with electrodes. It has also been difficult to use GBL and gamma-valero lactone for electrolyte of the batteries using lithium metal or lithium alloys in the negative electrodes since reduction decomposition potentials of these solvents are more noble than the potentials of the electrodes made from the foregoing materials. However, when the composite particles of the present invention are used for the negative electrode, GBL and gamma-valero lactone can be used without leading to decomposition of the electrolyte since the electrode potential using the composite particles becomes more noble than reduction decomposition potentials of these solvents. Further, PC, GBL and gamma-valero lactone have high dielectric constant, in other words, a high viscosity. Due to this high-viscosity, should the composite particles be fragmented, they would not come off from the electrode plate so easily.

When solvents such as EC, DMC, DEC, EMC, PC, GBL and gamma-valero lactone are adopted for a system in which lithium metal or a lithium alloy is used in a negative electrode, the electrolyte may decompose and gas may be produced when the battery is charged and stored at high temperatures. Moreover, if the battery is repeatedly charged and discharged, parallel to the charge/discharge reaction of the negative electrode, the electrolyte is gasified, lowering the charge/discharge efficiency, resulting in decreased cycle properties. However, the composite particles of the present invention do not react with the electrolytes in such a manner.

Lithium salts which dissolve into the foregoing solvents include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium salts of lower aliphatic carboxylic acid, LiCl, LiBr, LiI, chloroborane lithium, 4-phenil boric acid, borates such as bis(1,2-benzene diolate(2-)-O,O')lithium borate, bis(2,3-naphthalene diolate(2-)-O,O') lithium borate, bis(2,2'-biphenyl diolate(2-)-O,O')lithium borate, and bis(5-fluoro-2-olate-1-benzene sulfonic acid-O,O')lithium borate, and imido salts such as bis-trifluoromethane sulfonic acid imido lithium(($CF_3SO_2)_2$NLi), and bis-pentafluoroethane sulfonic acid imido lithium(($C_2F_5SO_2)_2$NLi). These lithium salts can be used individually or in mixture of two or more in an electrolyte.

Among these lithium salts, especially anion lithium salts of organic acid are superior to inorganic acid anion lithium salts such as lithium perchlorate and lithium fluorophosphate in terms of thermal stability. Due to this, these supporting electrolytes do not thermally decompose to lower the properties of the battery, even when used or stored at high temperatures, thus, are preferably used.

Anion lithium salts of organic acid preferably include at least one compound selected from a group comprising $(CF_3SO_2)_2NLi$, $(C_2F_5SO_2)_2NLi$, bis(1,2-benzene diolate (2-)-O,O')lithium borate, bis(2,3-naphthalene diolate(2-)-O, O')lithium borate, bis(2,2'-biphenyl diolate(2-)-O,O')lithium borate, and bis(5-fluoro-2-olate-1-benzene sulfonic acid -O,O')lithium borate.

The reduction decomposition withstanding voltage and the oxidation decomposition withstanding voltage of $(CF_3SO_2)_2NLi$ on a platinum electrode are respectively 0V and 4.7V against a lithium reference electrode. Similarly, those voltages of $(C_2F_5SO_2)_2$ NLi on a platinum electrode are respectively 0V and 4.7V, bis(5-fluoro-2-olate-1-benzene sulfonic acid-O,O')lithium borate, 0V and 4.5V, and bis(2,2'-biphenyl diolate(2-)-O,O')lithium borate, 0V and 4.1V or higher.

Therefore, these anion lithium salts of organic acid can be preferably used to enhance the energy density of the lithium secondary batteries.

On the other hand, the reduction decomposition withstanding voltage and oxidation decomposition withstand voltage of bis(1,2-benzene diolate(2-)-O,O')lithium borate on a platinum electrode are respectively 0V and 3.6V against a lithium reference electrode, and those of bis(2,3-naphthalene diolate(2-)-O,O')lithium borate on a platinum electrode are 0V and 3.8V. If an electrolyte, in which these supporting electrolytes are dissolved, is used for an active material such as lithium cobaltate, lithium nickelate and lithium manganate which generates a high voltage of not less than 4V against a lithium reference electrode, the supporting electrolytes decompose. However, transition metal sulfides, whose electromotive force is about 3V against a lithium reference electrode such as lithium-titanium disulfide ($LiTiS_2$) and lithium-molybdenum sulfide ($LiMoS_2$), can be used in these potential regions.

The amount of the electrolyte to be added to the battery is not specifically defined. Considering the amount of the positive electrode and the negative electrode materials and the size of the battery, required amount can simply be used. The amount of the supporting electrolytes to be dissolved against the non-aqueous electrolytes is not specifically defined, however, 0.2–2 mol/l, especially 0.5–1.5 mol/l are preferable.

It is effective to add other compounds to the electrolyte in order to improve discharge and charge/discharge properties. Such compounds include triethyl phosphite, triethanolamine, cyclic ethers, ethylene diamine, n-glaim, pyridine, triamide hexaphosphate, nitrobenzene direvatives, crown ethers, quaternary ammonium salt, and ethylene glycol dialkyl ether.

As a separator of the present invention, insulating thin films with fine pores, which have a large ion permeability and a predetermined mechanical strength, are used. It is desirable that the pores of the separators close at or above a predetermined temperature to increase resistance. For an organic solvent resistance and a hydrophobic property, olefin polymers including polypropylene and polyethylene can be used individually or in combination. Sheets, non-wovens and wovens made with glass fiber can also be used. The diameter of the fine pores of the separators is desirably set within the range through which positive electrode and negative electrode materials, binding materials, and conductive materials separated from electrode sheets can not penetrate. A desirable diameter is, for example, 0.01–1 μm. The thickness of the separator is generally 10–300 μm. The porosity is determined by the permeability of electrons and ions, material and membrane pressure, in general however, it is desirably 30–80%.

It is also possible to construct a battery such that polymer materials, which absorb and retain an organic electrolyte comprising solvents and lithium salts soluble in the solvents, are included in the electrode mixtures of the positive and negative electrodes, and porous separators, which comprise polymers capable of absorbing and retaining the organic electrolyte, are formed integrally with the positive and the negative electrode. As the polymer materials, any materials capable of absorbing and retaining organic electrolytes can be adopted. Among such materials, a copolymer of vinylidene fluoride and hexafluoro propylene is especially favorable.

The following is a detailed description of the materials used in the batteries of the present invention.

The positive electrode and the negative electrode of the battery of the present invention are constructed such that a current collector is coated with a mixture layer which includes the positive electrode active materials and the negative electrode materials capable of electrochemically and reversibly intercalating and de-intercalating lithium ions as main constituents, and conductive materials as well as binders.

(Manufacture of the Composite Particles)

In Table 1, components (pure elements, inter-metallic compounds, solid solution) of the solid phase A and the solid phase B of the composite particles used in the preferred embodiments of the present invention, composition ratios of elements, fusion temperatures, and solid phase line temperatures are shown. Commercially available highly pure reagents are used as materials for each element.

To obtain solid materials, powder or a block of each element contained in the composite particles is put into a fusion vessel in the composition ratio shown in Table 1, and fused at the temperature also shown in Table 1. The fused mixture is quenched by the roll-quenching method and solidified to form a solid material which is then heat treated at temperatures of 10° C.–50° C. lower temperature than the solid phase line temperatures shown in Table 1, in an inert atmosphere for 20 hours. After being heat treated, the material is ground with a ball mill, and classified using a sieve to prepare composite particles of 45 μm or less. An electron microscope observation confirmed, these composite particles have part of or the whole surface of the solid phase A thereof covered with the solid phase B.

The construction of the battery of the present invention is described below taking an example of a cylindrical battery according to preferred embodiments.

The First Preferred Embodiment

FIG. 1 shows a vertical cross section of a cylindrical battery of the present invention. In FIG. 1, a positive electrode plate 5 and a negative electrode plate 6 are spirally rolled a plurality of times via separators 7, and placed in a battery casing 1. Coming out from the positive electrode plate 5 is a positive electrode lead 5a, which is connected to a sealing plate 2. In the same manner, a negative electrode lead 6a comes out from a negative electrode plate 6, and is connected to the bottom of the battery casing 1. Insulating gasket 3 separates sealing plate 2 from battery casing 1.

Electronally conductive metals and alloys having organic electrolytic solution resistance can be used for the battery casing and lead plates. For example, such metals as iron, nickel, titanium, chromium, molybdenum, copper and aluminum and their alloys can be used. For the battery casing, stainless steel plate or processed Al—Mn alloy plate is favorably used, and for the positive electrode lead and the negative electrode lead, respectively aluminum and nickel are most favorable. For the battery casing, engineering plastics can be used independently or with metals in order to reduce weight.

Insulating rings 8 are disposed on the top and bottom of an electrode plate group 4. A safety valve can be used as a sealing plate. Apart from the safety valve, other conventionally used safety elements can be disposed. As an anti-overcurrent element, for example, fuses, bimetal and PTC elements can be used. To deal with increases in internal pressure of the battery casing, a cut can be provided to the battery casing, a gasket cracking method or a sealing plate cracking method can be applied, or the connection to the lead plate can be severed. As other methods, a protective circuit incorporating anti-overcharging and anti-overdischarging systems, can be included in or connected independently to a charger. As an anti-overcharging method, current can be cut off by an increase in internal pressure of the battery. In this case, a compound which increases internal pressure can be mixed with the electrode mixture or with the electrolytes. Such compounds include carbonates such as $Li_2CO_3$, $LiHCO_3$, $Na_2CO_3$, $NaHCO_3$, $CaCO_3$ and $MgCO_3$.

The cap, the battery casing, the sheet and the lead plate can be welded by conventional methods such as an alternative current or a direct current electric welding, a laser welding and an ultrasonic welding. As a sealing material, conventional compounds and composites such as asphalt can be used.

To prepare the negative electrode plate 6, 20 wt % of carbon powder and 5 wt % PVDF are mixed with 75 wt % of the composite particles synthesized under the foregoing conditions. The mixture is dispersed in dehydrated. N-methyl pyrrolidone to form a slurry. The slurry is coated onto a negative electrode current collector comprising copper foil, dried and rolled under pressure.

To prepare the positive electrode plate 5, 10 wt % of carbon powder and 5 wt % of PVDF are mixed with 85 wt % of lithium cobaltate powder. The mixture is dispersed in dehydrated N-methyl pyrrolidinone to form a slurry. The slurry is coated onto a positive electrode current collector comprising copper foil, and dried and rolled under pressure.

1.5 mol/l of $(C_2F_5SO_2)_2NLi$ is dissolved in a mixed solvent of EC and EMC which are mixed in a ratio of 1:1 by volume, and used as an electrolyte.

In the foregoing manner, batteries are constructed by using the materials shown in Table 1 for the negative electrode. These cylindrical batteries are 18 mm in diameter and 65 mm in height. The batteries are charged at a constant current of 100 mA until their voltage becomes 4.1V, and then discharged at a constant current of 100 mA until their voltage becomes 2.0V. The charge/discharge cycle is repeated 100 times, and the ratio of the discharge capacity at the 100th cycle to that of the first cycle is shown in Table 2 as the capacity retention rate. For comparison, results of batteries using graphite or an Al—Li alloy for negative electrodes are shown in Table 2.

Table 2 also shows capacity retention rates obtained by comparing the initial capacity measured when the batteries of the same construction are charged at the constant current of 100 mA until their voltage becomes 4.1V and discharged at the constant current of 100 mA until their voltage becomes 2.0V, and the capacity measured when the same batteries are charged again under the same conditions until their voltage becomes 4.1V and stored for 20 days at 60° C. The capacity retention rate is a ratio of the discharge capacities after storage to before storage. After storing, a hole is made on the battery and gas is collected in liquid paraffin. The amount of the collected gas is shown as a ratio against the amount of gas (=100) produced by a battery using graphite in the negative electrode.

The Second Preferred Embodiment

Batteries are prepared using PC as a solvent of the electrolyte and dissolving 1.0 mol/l of bis(5-fluoro-2-olate-1-benzene sulfonic acid-O,O')lithium borate as a supporting electrolyte. Besides these points, batteries are formed and tests are conducted in the same manner as the first embodiment. Results are shown in Table 3.

The Third Preferred Embodiment

Batteries are prepared using GBL as a solvent of the electrolyte and dissolving 1.2 mol/l of bis(2,2'-biphenyl diolate(2-)-O,O')lithium borate as a supporting electrolyte. In all other respects, batteries are formed and tests are conducted in the same manner as the first embodiment. Results are shown in Table 4.

The Fourth Preferred Embodiment

Batteries are prepared in the following manner. As a positive electrode current collector, titanium foil of 0.02 mm in thickness is used. EC, DMC and DEC are mixed together at a ratio of 2:3:3 by volume and used as a mixed solvent of the electrolyte. 1.2 mol/l of $(CF_3SO_2)_2NLi$ is dissolved in the electrolyte as a supporting electrolyte. Apart from the foregoing points, batteries are formed and tests are conducted in the same manner as the first embodiment. Results are shown in Table 5.

The Fifth Preferred Embodiment

Batteries are prepared using $LiTiS_2$ as a positive electrode material, and gamma-valerolactone as a solvent of the electrolytic solution. 1.2 mol/l of bis(1,2-benzene diolate (2-)-O,O')lithium borate is dissolved in the electrolyte as a supporting electrolyte. Apart from the foregoing points, batteries are formed and tests are conducted in the same manner as the first embodiment. The batteries are charged at the constant current of 100 mA until their voltage becomes 2.8V, and then discharged at the constant current of 100 mA until their voltage becomes 0.5V. The charge/discharge cycle is repeated 100 times, and ratio of the discharge capacity at the 100th cycle to that of the first cycle is shown in Table 6 as the capacity retention rate. Table 6 also shows capacity retention rates gained by comparing the initial capacity measured when the batteries of the same construction are charged at the constant current of 100 mA until their voltage becomes 2.8V and discharged at the constant current of 100 mA until their voltage becomes 0.5V, and the capacity measured when the same batteries are charged again on the same condition until their voltage becomes 2.8V and stored for 20 days at 60° C. The amount of gas collected in liquid paraffin is shown in Table 6 as well.

The Sixth Preferred Embodiment

Batteries are prepared in the following manner. $LiTiS_2$ is used as a positive electrode material. EC and DEC are mixed together at a ratio of 1:2 by volume and used as a, mixed solvent of the electrolyte. 1.0 mol/l of bis(2,3-naphthalene diolate(2-)-O,O')lithium borate is dissolved as a supporting electrolyte. Apart from the foregoing points, batteries are formed in the same manner as the first embodiment. These batteries are tested using the same method as that of the fifth preferred embodiment. Results are shown in Table 7.

As shown in Tables 2–7, the batteries of the present invention have a higher energy density and enjoy the same level of cycle capacity retention rate compared with the conventional batteries which use graphite as the negative electrode. Furthermore, the batteries of the present invention produce lesser amounts of gas than the conventional batteries when fully charged and stored at high temperatures.

Regarding constituent elements of the negative electrode materials, when the solid phase A is Sn, Mg selected from group 2 elements, Fe and Mo from transition elements, Zn and Cd from group 12 elements, In from group 13 elements and Pb from group 14 elements are used. However, similar results are obtained with other elements selected from each group. The composition ratio of the constituent elements of the negative electrode material is not specifically defined, on the condition that two phases are created and one of which (solid phase A) is mainly composed of Sn, and partly or entirely covered with the other phase (solid phase B). The solid phase A can be composed not only of Sn but also traces of other elements such as O, C, N, S, Ca, Mg, Al, Fe, W, V, Ti, Cu, Cr, Co, and P.

When the solid phase A is Si, Mg selected from group 2 elements, Co and Ni from transition elements, Zn from group 12 elements, Al from group 13 elements and Sn from group 14 elements are used. However, similar results are obtained with other elements selected from each group. Similarly, when the solid phase A is Zn, Mg from group 2 elements, Cu and V from transition elements, Cd from group 12 elements, Al from group 13 elements and Ge from group 14 elements are used. However, similar results are obtained with other elements selected from each group. The composition ratio of the constituent elements of the negative electrode material is not specifically defined, on the condition that two phases are created and one of which (solid phase A) is mainly composed of Si and Zn, and partly or entirely covered with the other phase (solid phase B). The solid phase A can be composed not only of Si and Zn but also traces of elements such as O, C, N, S, Ca, Mg, Al, Fe, W, V, Ti, Cu, Cr, Co, and P.

It is to be understood that the foregoing combinations and mixture ratios of the electrolytes, the materials for the supporting electrolytes, and the amount added constitute only part of the present invention. Depending on conditions for use and other necessary elements, any combination, mixture ratio and the amount to be added can be applied with similar results. Thus, the electrolytes of the present invention are not limited to the combination, mixture ratio and the amount to be added described in the preferred embodiments. However, depending on the positive electrode materials, specified supporting electrolytes are required due to the oxidation resistance voltages.

The battery of the present invention can be used for portable information terminals, portable electronic devices, small size domestic electricity storing devices, motor cycles, electric cars and hybrid electric cars. However, the application of the battery is not limited to the foregoing.

APPLICABILITY IN THE INDUSTRY

A non-aqueous electrolyte secondary battery using the non-aqueous electrolyte and the composite particles according to the present invention shows high energy density compared with conventional one which uses carbon materials as a negative electrode material. It also shows an improved charge/discharge cycle life characteristics. As such, the batteries of the present invention can be used in portable information terminals, portable electronic devices, domestic portable electricity storing devices, motor cycles, electric cars and hybrid electric cars, thereby offering remarkable benefits when industrially applied.

TABLE 1

| Negative electrode material | Phase A | Phase B | Melting temperature (° C.) | Solid phase line temperature (° C.) | Composition (Atom %) |
|---|---|---|---|---|---|
| Material A | Sn | Mg$_2$Sn | 770 | 204 | Sn:Mg = 50:50 |
| Material B | Sn | FeSn$_2$ | 1540 | 513 | Sn:Fe = 70:30 |
| Material C | Sn | MoSn$_2$ | 1200 | 800 | Sn:Mo = 70:30 |
| Material D | Sn | Zn, Sn Solid S. | 420 | 199 | Sn:Zn = 90:10 |
| Material E | Sn | Cd, Sn Solid S. | 232 | 133 | Sn:Cd = 95:5 |
| Material F | Sn | In, Sn Solid S. | 235 | 224 | Sn:In = 98:2 |
| Material G | Sn | Sn, Pb Solid S. | 232 | 183 | Sn:Pb = 80:20 |
| Material H | Si | Mg$_2$Si | 1415 | 946 | Si:Mg = 70:30 |
| Material I | Si | CoSi$_2$ | 1495 | 1259 | Si:Co = 85:15 |
| Material J | Si | NiSi$_2$ | 1415 | 993 | Si:Ni = 69:31 |
| Material K | Si | Si, Zn Solid S. | 1415 | 420 | Si:Zn = 50:50 |
| Material L | Si | Si, Al Solid S. | 1415 | 577 | Si:Al = 40:60 |
| Material M | Si | Si, Sn Solid S. | 1415 | 232 | Si:Sn = 50:50 |
| Material N | Zn | Mg$_2$Zn$_{11}$ | 650 | 364 | Zn:Mg = 92.9:7.8 |
| Material O | Zn | Zn, Cu Solid S. | 1085 | 425 | Zn:Cu = 97:3 |
| Material P | Zn | VZn$_{11}$ | 700 | 420 | Zn:V = 94:6 |
| Material Q | Zn | Zn, Cd Solid S. | 420 | 266 | Zn:Cd = 50:50 |
| Material R | Zn | Zn, Al Solid S. | 661 | 381 | Zn:Al = 90:10 |
| Material S | Zn | Zn, Ge Solid S. | 938 | 394 | Zn:Ge = 97:3 |

TABLE 2

| Battery | Negative electrode material | Initial Discharge Capacity (mAh) | 100th Discharge Capacity (mAh) | Capacity retention rate (cycle) (%) | Capacity retention rate (%) (storing) | Gas generation rate (%) (storing) |
|---|---|---|---|---|---|---|
| 1 | Material A | 1882 | 1731 | 92 | 90 | 82 |
| 2 | B | 1874 | 1705 | 91 | 91 | 81 |
| 3 | C | 1857 | 1671 | 90 | 89 | 84 |
| 4 | D | 1862 | 1713 | 92 | 92 | 80 |
| 5 | E | 1885 | 1753 | 90 | 90 | 82 |
| 6 | F | 1871 | 1740 | 93 | 88 | 83 |
| 7 | G | 1881 | 1731 | 92 | 89 | 84 |
| 8 | H | 1966 | 1809 | 92 | 90 | 78 |
| 9 | I | 1950 | 1775 | 91 | 91 | 75 |
| 10 | J | 1984 | 1845 | 93 | 91 | 73 |
| 11 | K | 1979 | 1821 | 92 | 90 | 73 |
| 12 | L | 1999 | 1799 | 90 | 89 | 72 |
| 13 | M | 1991 | 1832 | 92 | 89 | 74 |
| 14 | N | 1949 | 1813 | 93 | 90 | 79 |
| 15 | O | 1955 | 1799 | 92 | 91 | 81 |
| 16 | P | 1911 | 1739 | 91 | 92 | 82 |
| 17 | Q | 1920 | 1766 | 92 | 92 | 78 |
| 18 | R | 1959 | 1802 | 92 | 89 | 80 |
| 19 | S | 1917 | 1744 | 91 | 91 | 77 |
| 20 | graphite | 1520 | 1429 | 94 | 83 | 100 |
| 21 | Al—Li alloy | 1876 | 1632 | 87 | 80 | 112 |

TABLE 3

| Battery | Negative electrode material | Initial Discharge Capacity (mAh) | 100th Discharge Capacity (mAh) | Capacity retention rate (cycle) (%) | Capacity retention rate (%) (storing) | Gas generation rate (%) (storing) |
| --- | --- | --- | --- | --- | --- | --- |
| 1 | Material A | 1887 | 1717 | 91 | 92 | 82 |
| 2 | B | 1879 | 1691 | 90 | 93 | 79 |
| 3 | C | 1862 | 1657 | 89 | 91 | 80 |
| 4 | D | 1867 | 1699 | 91 | 94 | 79 |
| 5 | E | 1890 | 1739 | 92 | 92 | 82 |
| 6 | F | 1876 | 1726 | 92 | 90 | 80 |
| 7 | G | 1886 | 1716 | 91 | 91 | 79 |
| 8 | H | 1971 | 1794 | 91 | 92 | 74 |
| 9 | I | 1955 | 1760 | 90 | 93 | 72 |
| 10 | J | 1989 | 1830 | 92 | 92 | 71 |
| 11 | K | 1984 | 1825 | 92 | 92 | 71 |
| 12 | L | 2004 | 1824 | 91 | 91 | 69 |
| 13 | M | 1996 | 1816 | 91 | 90 | 70 |
| 14 | N | 1954 | 1798 | 92 | 90 | 77 |
| 15 | O | 1960 | 1803 | 92 | 92 | 82 |
| 16 | P | 1916 | 1724 | 90 | 94 | 81 |
| 17 | Q | 1925 | 1752 | 91 | 94 | 79 |
| 18 | R | 1964 | 1807 | 92 | 91 | 78 |
| 19 | S | 1922 | 1749 | 91 | 93 | 76 |
| 20 | graphite | 1525 | 1418 | 85 | 85 | 100 |
| 21 | Al—Li alloy | 1881 | 1599 | 85 | 82 | 118 |

TABLE 4

| Battery | Negative electrode material | Initial Discharge Capacity (mAh) | 100th Discharge Capacity (mAh) | Capacity retention rate (cycle) (%) | Capacity retention rate (%) (storing) | Gas generation rate (%) (storing) |
| --- | --- | --- | --- | --- | --- | --- |
| 1 | Material A | 1880 | 1692 | 90 | 90 | 80 |
| 2 | B | 1872 | 1704 | 91 | 91 | 79 |
| 3 | C | 1855 | 1632 | 88 | 92 | 78 |
| 4 | D | 1860 | 1674 | 90 | 93 | 77 |
| 5 | E | 1883 | 1714 | 91 | 92 | 79 |
| 6 | F | 1869 | 1719 | 92 | 91 | 77 |
| 7 | G | 1879 | 1729 | 92 | 92 | 76 |
| 8 | H | 1964 | 1787 | 91 | 90 | 71 |
| 9 | I | 1948 | 1797 | 92 | 92 | 70 |
| 10 | J | 1982 | 1784 | 90 | 92 | 69 |
| 11 | K | 1977 | 1799 | 91 | 91 | 69 |
| 12 | L | 1997 | 1797 | 90 | 91 | 67 |
| 13 | M | 1989 | 1830 | 92 | 91 | 68 |
| 14 | N | 1947 | 1752 | 90 | 92 | 75 |
| 15 | O | 1953 | 1777 | 91 | 93 | 80 |
| 16 | P | 1909 | 1737 | 91 | 95 | 79 |
| 17 | Q | 1918 | 1726 | 90 | 93 | 77 |
| 18 | R | 1957 | 1800 | 92 | 92 | 76 |
| 19 | S | 1915 | 1743 | 91 | 94 | 74 |
| 20 | graphite | 1518 | 1397 | 92 | 84 | 100 |
| 21 | Al—Li alloy | 1874 | 1555 | 83 | 83 | 120 |

TABLE 5

| Battery | Negative electrode material | Initial Discharge Capacity (mAh) | 100th Discharge Capacity (mAh) | Capacity retention rate (cycle) (%) | Capacity retention rate (%) (storing) | Gas generation rate (%) (storing) |
| --- | --- | --- | --- | --- | --- | --- |
| 1 | Material A | 1877 | 1708 | 91 | 91 | 77 |
| 2 | B | 1869 | 1682 | 90 | 90 | 71 |
| 3 | C | 1852 | 1648 | 89 | 91 | 75 |
| 4 | D | 1857 | 1690 | 91 | 92 | 73 |
| 5 | E | 1880 | 1730 | 92 | 93 | 77 |
| 6 | F | 1866 | 1717 | 92 | 91 | 76 |

TABLE 5-continued

| Battery | Negative electrode material | Initial Discharge Capacity (mAh) | 100th Discharge Capacity (mAh) | Capacity retention rate (cycle) (%) | Capacity retention rate (%) (storing) | Gas generation rate (%) (storing) |
|---|---|---|---|---|---|---|
| 7 | G | 1876 | 1707 | 91 | 92 | 75 |
| 8 | H | 1961 | 1785 | 91 | 90 | 69 |
| 9 | I | 1945 | 1751 | 90 | 91 | 70 |
| 10 | J | 1979 | 1821 | 92 | 92 | 67 |
| 11 | K | 1974 | 1816 | 92 | 93 | 66 |
| 12 | L | 1994 | 1815 | 91 | 90 | 63 |
| 13 | M | 1986 | 1807 | 91 | 91 | 66 |
| 14 | N | 1944 | 1788 | 92 | 92 | 74 |
| 15 | O | 1950 | 1794 | 92 | 91 | 80 |
| 16 | P | 1906 | 1715 | 90 | 93 | 77 |
| 17 | Q | 1915 | 1743 | 91 | 92 | 75 |
| 18 | R | 1954 | 1798 | 92 | 90 | 74 |
| 19 | S | 1912 | 1740 | 91 | 91 | 73 |
| 20 | graphite | 1515 | 1409 | 93 | 83 | 100 |
| 21 | Al—Li alloy | 1871 | 1590 | 85 | 79 | 123 |

TABLE 6

| Battery | Negative electrode material | Initial Discharge Capacity (mAh) | 100th Discharge Capacity (mAh) | Capacity retention rate (cycle) (%) | Capacity retention rate (%) (storing) | Gas generation rate (%) (storing) |
|---|---|---|---|---|---|---|
| 1 | Material A | 2820 | 2538 | 90 | 91 | 79 |
| 2 | B | 2808 | 2499 | 89 | 93 | 77 |
| 3 | C | 2783 | 2499 | 88 | 92 | 76 |
| 4 | D | 2790 | 2539 | 91 | 91 | 76 |
| 5 | E | 2825 | 2571 | 91 | 92 | 74 |
| 6 | F | 2804 | 2552 | 91 | 90 | 75 |
| 7 | G | 2819 | 2593 | 92 | 91 | 72 |
| 8 | H | 2946 | 2740 | 93 | 91 | 72 |
| 9 | I | 2922 | 2688 | 92 | 93 | 73 |
| 10 | J | 2973 | 2646 | 89 | 92 | 70 |
| 11 | K | 2966 | 2699 | 91 | 90 | 71 |
| 12 | L | 2996 | 2756 | 92 | 91 | 69 |
| 13 | M | 2984 | 2715 | 91 | 92 | 68 |
| 14 | N | 2921 | 2687 | 92 | 93 | 73 |
| 15 | O | 2930 | 2666 | 91 | 90 | 79 |
| 16 | P | 2864 | 2578 | 90 | 92 | 79 |
| 17 | Q | 2877 | 2676 | 93 | 91 | 77 |
| 18 | R | 2936 | 2613 | 89 | 93 | 76 |
| 19 | S | 2873 | 2614 | 91 | 92 | 73 |
| 20 | graphite | 2277 | 2049 | 90 | 82 | 100 |
| 21 | Al—Li alloy | 2811 | 2333 | 83 | 83 | 122 |

TABLE 7

| Battery | Negative electrode material | Initial Discharge Capacity (mAh) | 100th Discharge Capacity (mAh) | Capacity retention rate (cycle) (%) | Capacity retention rate (%) (storing) | Gas generation rate (%) (storing) |
|---|---|---|---|---|---|---|
| 1 | Material A | 2726 | 2426 | 89 | 89 | 78 |
| 2 | B | 2714 | 2443 | 90 | 90 | 76 |
| 3 | C | 2690 | 2340 | 87 | 90 | 77 |
| 4 | D | 2697 | 2400 | 89 | 91 | 77 |
| 5 | E | 2730 | 2454 | 90 | 90 | 76 |
| 6 | F | 2710 | 2466 | 91 | 89 | 74 |
| 7 | G | 2725 | 2480 | 91 | 90 | 73 |
| 8 | H | 2848 | 2563 | 90 | 92 | 70 |
| 9 | I | 2825 | 2563 | 91 | 91 | 71 |
| 10 | J | 2874 | 2558 | 89 | 92 | 70 |
| 11 | K | 2867 | 2580 | 90 | 91 | 68 |
| 12 | L | 2896 | 2577 | 89 | 93 | 68 |
| 13 | M | 2884 | 2624 | 91 | 91 | 69 |

TABLE 7-continued

| Battery | Negative electrode material | Initial Discharge Capacity (mAh) | 100th Discharge Capacity (mAh) | Capacity retention rate (cycle) (%) | Capacity retention rate (%) (storing) | Gas generation rate (%) (storing) |
|---|---|---|---|---|---|---|
| 14 | N | 2823 | 2484 | 88 | 89 | 74 |
| 15 | O | 2832 | 2520 | 89 | 93 | 79 |
| 16 | P | 2768 | 2491 | 90 | 92 | 76 |
| 17 | Q | 2781 | 2503 | 90 | 93 | 77 |
| 18 | R | 2838 | 2583 | 91 | 90 | 75 |
| 19 | S | 2777 | 2472 | 89 | 94 | 73 |
| 20 | graphite | 2201 | 1937 | 88 | 80 | 100 |
| 21 | Al—Li alloy | 2717 | 2255 | 83 | 80 | 128 |

What is claimed is:

1. A non-aqueous electrolyte secondary battery comprising:
a positive electrode,
a negative electrode capable of intercalating and de-intercalating lithium,
a non-aqueous electrolyte solution, and
a separator or a solid electrolyte,
wherein:
said negative electrode comprises composite particles,
each of said composite particles comprises a nuclear particle consisting essentially of an element selected from the group consisting of tin, silicon, and zinc,
at least a part of a surface of said nuclear particles is coated with either a solid solution or an inter-metallic compound,
said solid solution or intermetallic compound comprises said element selected from the group consisting of tin, silicon, and zinc and at least one additional element, said additional element selected from the group consisting of group 2 elements, transition elements, group 12 elements, group 13 elements and group 14 elements exclusive of carbon, and exclusive of said element selected from the group consisting of tin, silicon, and zinc, and
said non-aqueous electrolyte solution comprises an organic solvent and a lithium salt of an organic acid.

2. The non-aqueous electrolyte secondary battery of claim 1, wherein said organic solvent comprises at least one compound selected from the group consisting of ethylene carbonate, dimethyl carbonate, diethyl carbonate, ethylmethyl carbonate, propylene carbonate, gamma-butyro lactone, and gamma-valero lactone.

3. The non-aqueous electrolyte secondary battery of claim 1, wherein said lithium salt of said organic acid is at least one compound selected from the group consisting bis-trifluoromethane sulfonic acid imido lithium, bis-pentafluoroethane sulfonic acid imido lithium, bis(1,2-benzene diolate(2-)-O,O')lithium borate, bis(2,3-naphthalene diolate(2-)-O,O')lithium borate, bis(2,2'-biphenyl diolate(2-)-O,O')lithium borate, and bis(5-fluoro-2-olate-1-benzene-sulfonic acid-O,O')lithium borate.

4. The non-aqueous electrolyte secondary battery of claim 1, wherein said element selected from the group consisting of tin, silicon, and zinc is tin.

5. The non-aqueous electrolyte secondary battery of claim 1, wherein said element selected from the group consisting of tin, silicon, and zinc is silicon.

6. The non-aqueous electrolyte secondary battery of claim 1, wherein said element selected from the group consisting of tin, silicon, and zinc is zinc.

7. The non-aqueous electrolyte secondary battery of claim 1, wherein said additional element is selected from the group consisting of Mg, Fe, Mo, Zn, Cd, In, Pb, Co, Ni, Al, Sn, Cu, V, and Ge; and wherein when said element selected from the group consisting of tin, silicon, and zinc is tin, said additional element is not tin, and when said element selected from the group consisting of tin, silicon, and zinc is zinc, said additional element is not zinc.

8. A non-aqueous electrolyte secondary battery comprising:
a positive electrode,
a negative electrode capable of intercalating and de-intercalating lithium,
a non-aqueous electrolyte solution, and
a separator or a solid electrolyte,
wherein:
said negative electrode comprises composite particles,
each of said composite particles comprises a nuclear particle comprising silicon,
at least a part of a surface of said nuclear particles is coated with either a solid solution or an inter-metallic compound,
said solid solution or intermetallic compound comprises silicon and at least one additional element, said additional element selected from the group consisting of group 2 elements, transition elements, group 12 elements, group 13 elements and group 14 elements exclusive of carbon and silicon, and
said non-aqueous electrolyte solution comprises an organic solvent and a lithium salt of an organic acid.

9. The non-aqueous electrolyte secondary battery of claim 8, wherein said organic solvent comprises at least one compound selected from the group consisting of ethylene carbonate, dimethyl carbonate, diethyl carbonate, ethylmethyl carbonate, propylene carbonate, gamma-butyro lactone, and gamma-valero lactone.

10. The non-aqueous electrolyte secondary battery of claim 8, wherein said lithium salt of said organic acid is at least one compound selected from the group consisting bis-trifluoromethane sulfonic acid imido lithium, bis-pentafluoroethane sulfonic acid imido lithium, bis(1,2-benzene diolate(2-)-O,O')lithium borate, bis(2,3-naphthalene diolate(2-)-O,O')lithium borate, bis(2,2'-biphenyl diolate(2-)-O,O')lithium borate, and bis(5-fluoro-2-olate-1-benzene-sulfonic acid-O,O')lithium borate.

11. The non-aqueous electrolyte secondary battery of claim 8, wherein said additional element is selected from the group consisting of Mg, Co, Ni, Zn, Al, and Sn.

* * * * *